US012695820B2

(12) United States Patent
   Banta

(10) Patent No.: US 12,695,820 B2
(45) Date of Patent: Jul. 28, 2026

(54) SMARTPHONE CASE WITH REAR-FACING VIEWFINDER DISPLAY

(71) Applicant: Irvin Joel Banta, Owens Cross Roads, AL (US)

(72) Inventor: Irvin Joel Banta, Owens Cross Roads, AL (US)

( * ) Notice: Subject to any disclaimer, the term of this patent is extended or adjusted under 35 U.S.C. 154(b) by 0 days.

(21) Appl. No.: 19/209,800

(22) Filed: May 16, 2025

(65) Prior Publication Data

US 2025/0358352 A1     Nov. 20, 2025

Related U.S. Application Data

(60) Provisional application No. 63/648,650, filed on May 16, 2024.

(51) Int. Cl.
   H04M 1/02       (2006.01)
   G06F 1/16       (2006.01)
   (Continued)

(52) U.S. Cl.
   CPC ........ H04M 1/0203 (2025.01); G06F 1/1628 (2013.01); G06F 1/1629 (2025.01); G06F 1/182 (2013.01); G06F 1/184 (2013.01); G06F 1/188 (2013.01); G06F 1/189 (2013.01); G06F 1/266 (2013.01); G06F 1/3212 (2013.01); G06F 1/3265 (2013.01)

(58) Field of Classification Search
   CPC ...... H04M 1/0203; G06F 1/1629; G06F 1/28; G06F 1/182; G06F 1/184; G06F 1/188; G06F 1/189; G06F 1/266; G06F 1/3212
   See application file for complete search history.

(56) References Cited

U.S. PATENT DOCUMENTS

2020/0311011 A1*  10/2020  Kim ...................... G06F 1/3287
2021/0278942 A1*   9/2021  Jung ............... H04M 1/724092
2023/0026952 A1*   1/2023  Han ....................... G06F 21/31

FOREIGN PATENT DOCUMENTS

CN          102984336  A  *  3/2013   ............. G06F 1/203

OTHER PUBLICATIONS

Mobile terminal and method for implementing intelligent temperature control thereby, Mar. 20, 2013 (Year: 2013).*

* cited by examiner

*Primary Examiner* — Muthuswamy G Manoharan

(57)                ABSTRACT

The present invention relates to a production-ready smartphone cases designed to enhance video content creation by utilizing advanced rear-camera technologies available in modern smartphones. The invention integrates a finalized, manufacturable electronics core comprising a precisely defined four-layer FR-4 printed circuit board (PCB) ready for high-volume production, a custom USB-C cable assembly supporting DisplayPort Alternate Mode, and an off-the-shelf 1.77-inch IPS LCD display module offering high brightness, contrast, and wide viewing angles. This integrated system provides a high-definition, low-latency live feed from the smartphone's superior rear camera, enabling optimal self-recording, vlogging, and live-streaming. Additionally, the modular design allows the same electronics core to seamlessly fit into multiple injection-molded smartphone-specific shells, thereby significantly enhancing manufacturability, reducing tooling complexity, and offering substantial practical improvements over existing solutions.

6 Claims, 14 Drawing Sheets

Interior View of Lower Case Shell with Electronics Installed

(51) Int. Cl.
| | |
|---|---|
| *G06F 1/18* | (2026.01) |
| *G06F 1/184* | (2026.01) |
| *G06F 1/188* | (2026.01) |
| *G06F 1/26* | (2006.01) |
| *G06F 1/3212* | (2019.01) |
| *G06F 1/3234* | (2019.01) |

Rear Facing View

107

106

Perspective Rear Facing View

108

109

Perspective Rear Facing View

111

110

Perspective Rear Facing View

Perspective Rear Facing View

Profile Views

Front Facing View

Perspective Front Facing View

Perspective Front Facing View

Interior View of Lower Case Shell with Electronics Installed

400

Exploded Electronics Assembly Shared Across Case Models

405

406

Alternate Phone-Specific Housings

Interior View of Upper Shell (Electronics-Free Cover Component)

Block Diagram of the Electronic Architecture

SMARTPHONE CASE WITH REAR-FACING VIEWFINDER DISPLAY

CROSS-REFERENCE TO RELATED APPLICATIONS

This application claims the benefit of U.S. Provisional Patent Application No. 63/648,650, filed May 16, 2024, under 35 U.S.C. § 119(e), the contents of which are incorporated herein by reference in their entirety.

BACKGROUND OF THE INVENTION

The present invention relates to smartphone accessories and, more particularly, to protective cases that incorporate an integrated rear-facing display driven via USB-C DisplayPort Alternate Mode to operate as a live viewfinder for the smartphone's rear cameras.

DESCRIPTION OF RELATED ART

Smartphone cases incorporating secondary displays are known. Representative examples include covers that display notifications or other information (U.S. Pat. No. 10,498,870 B2), cases with customizable or decorative rear screens (US 2023/0297138 A1), flexible or extension-display housings (KR 101512364 B1; JP 6407206 B2), cases with detachable or aesthetic LCD modules (U.S. D 879,761 S1), and battery cases that accommodate additional display devices (U.S. Pat. No. 10,452,105 B2; U.S. D 721,687 S1). While these references expand screen real estate or enhance device aesthetics, none address the challenge of providing a real-time rear-facing viewfinder that leverages the superior imaging capabilities of the smartphone's rear camera for self-recording. Accordingly, a need exists for a protective smartphone case that offers such functionality while maintaining compatibility with standard USB-C interfaces.

SUMMARY OF THE INVENTION

In one aspect, the invention provides a smartphone case comprising an integrated electronic system, including a multi-layer printed circuit board (PCB), a rechargeable battery, and a custom USB-C cable assembly compatible with DisplayPort Alternate Mode. This system also features a compact IPS LCD display module for real-time video viewing, facilitating ease of manufacturing and adaptability across various injection-molded case shells specifically tailored to different smartphone models.

Leveraging standard USB-C negotiation allows automatic setup of DisplayPort Alternate Mode, providing users with instant plug-and-play functionality. The low latency and high refresh rate of the integrated display greatly enhance usability, particularly beneficial during live content creation or video blogging.

By utilizing the smartphone's rear camera instead of the front-facing camera, the invention significantly improves video quality and user experience, simplifying the workflow for digital content creators who typically require complex setups to achieve professional-quality video.

In preferred embodiments, a single standardized electronics sub-assembly—including a display, USB-C Alt-Mode interface, PCB, and rechargeable power source—is integrated into each of a plurality of smartphone-specific protective housings. This design enables the same electronics sub-assembly to be efficiently mass-produced and integrated into multiple phone-specific case models, with only the external plastic housing molds varying between smartphone models.

Collectively, these inventive features significantly enhance user capability for digital content creation, particularly benefiting vloggers, live-streamers, and professional content producers by streamlining content framing, improving recording quality, and providing an integrated, user-friendly solution. By strategically leveraging the superior optics and capabilities of the rear camera through a conveniently placed secondary display, the invention offers a unique, non-obvious solution specifically tailored to meet the needs of digital content creators, clearly distinguishing itself from existing technologies in the field.

BRIEF DESCRIPTIONS OF DRAWINGS

DETAILED DESCRIPTION OF THE INVENTION

Figure 1A:
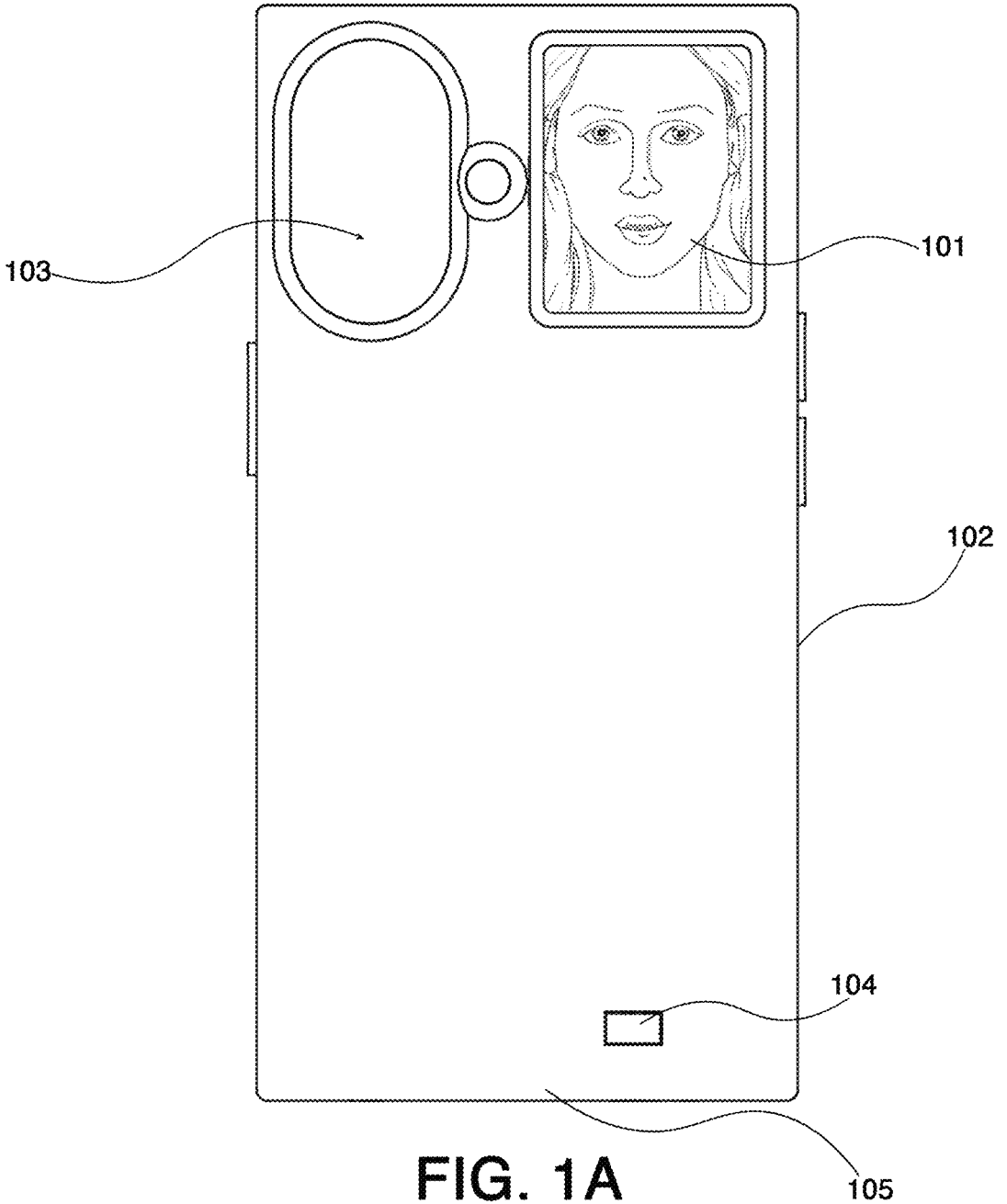
FIG. 1A is a rear-facing view of a smartphone case with a rear-facing viewfinder display.
Figure 1B:
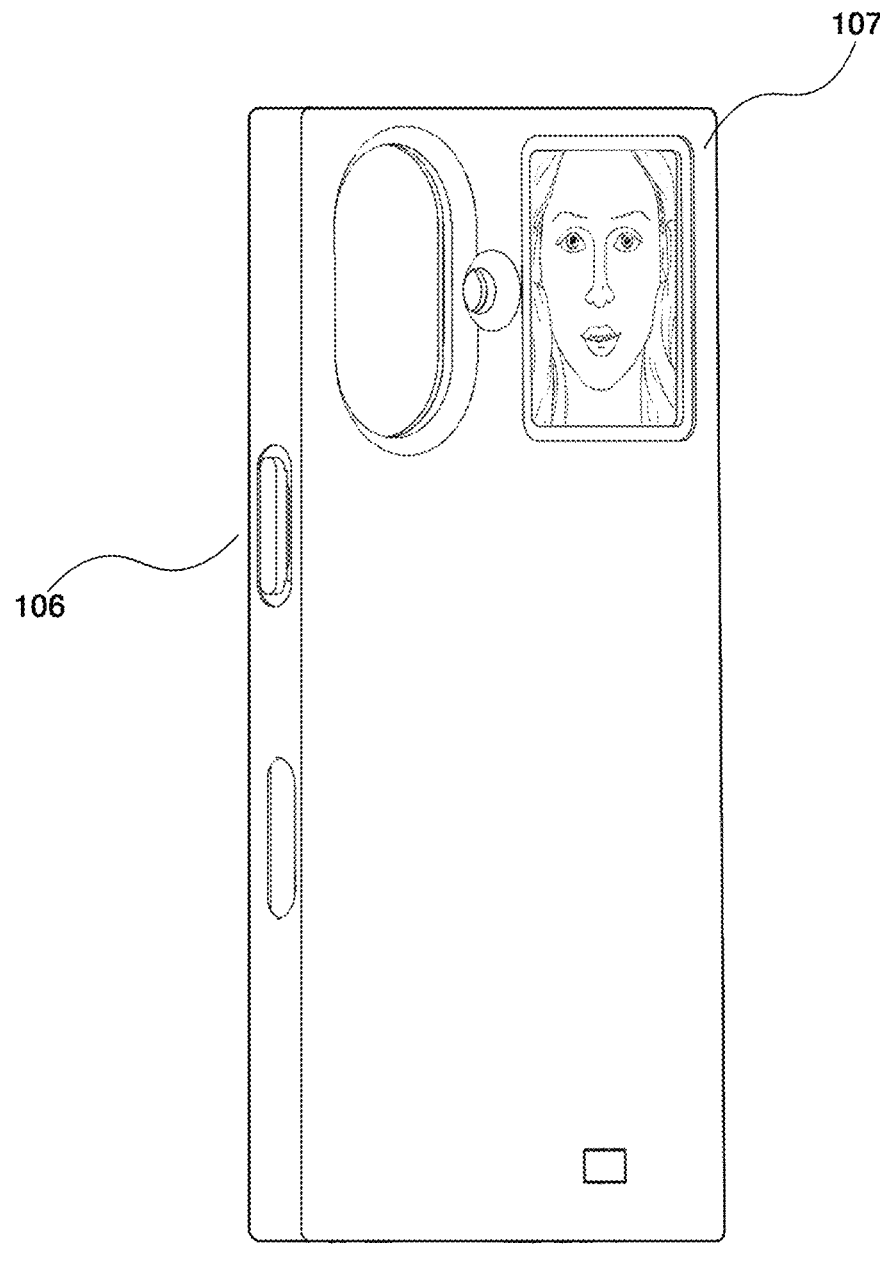
FIG. 1B is a rear-facing view of the smartphone case, illustrating a protective rim around the viewfinder display and button overlays.
Figure 1C:
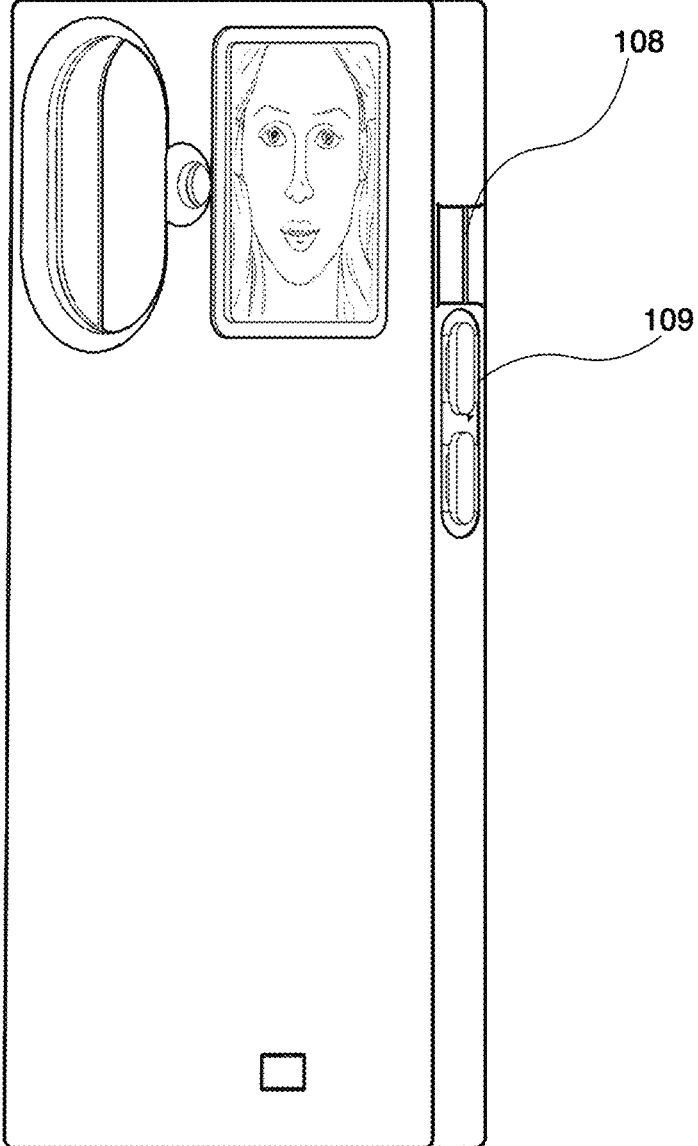
FIG. 1C is a rear-facing view of the smartphone case highlighting additional access ports and control interfaces.
Figure 1D:
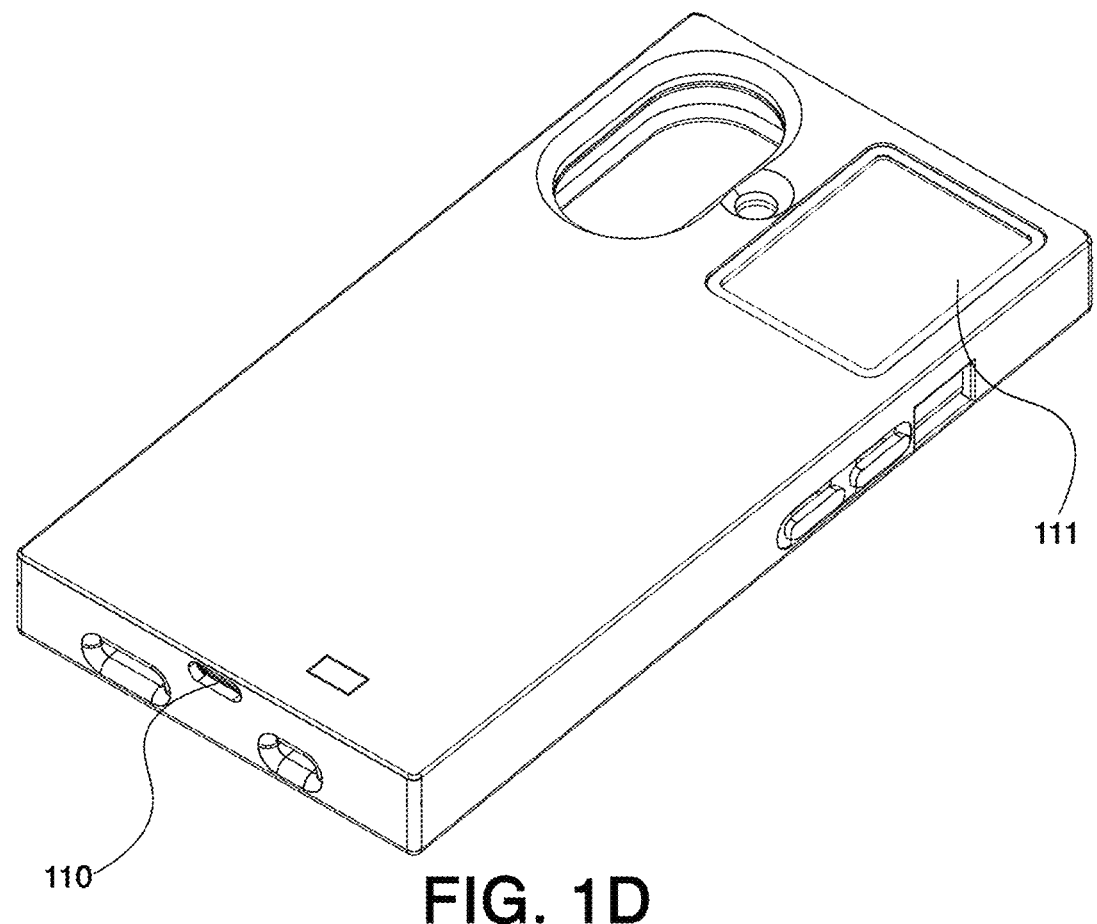
FIG. 1D is a rear-facing view of the smartphone case, showing the USB-C port opening and protective features around the display.
Figure 1E:
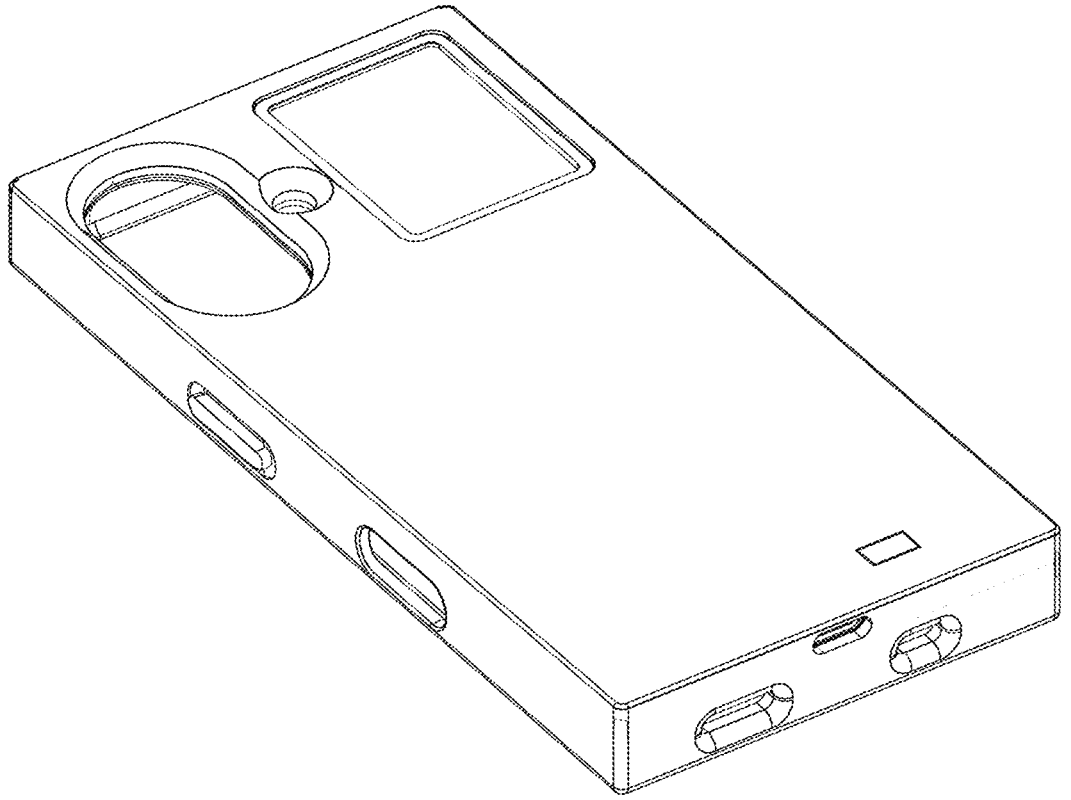
FIG. 1E is a simplified rear-facing view of the smartphone case.
Figure 2D:
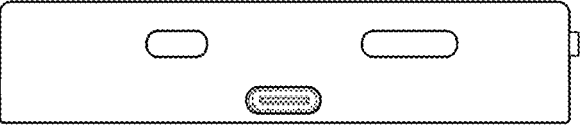
FIG. 2D is a bottom view of the smartphone case showing the USB-C interface alignment.
Figure 2C:
FIG. 2C is a top view of the smartphone case.
Figure 2B:
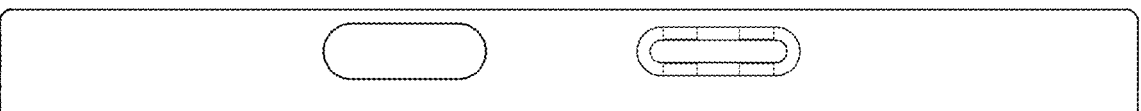
FIG. 2B is a profile view of the smartphone case demonstrating the thickness and layered structure accommodating internal components.
Figure 2A:
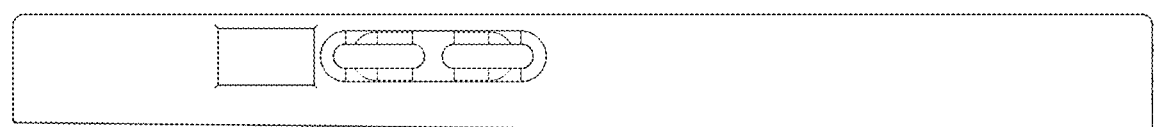
FIG. 2A is a profile view of the smartphone case showing the overall side geometry and locations of button overlays and mute switch access.
Figure 3A:
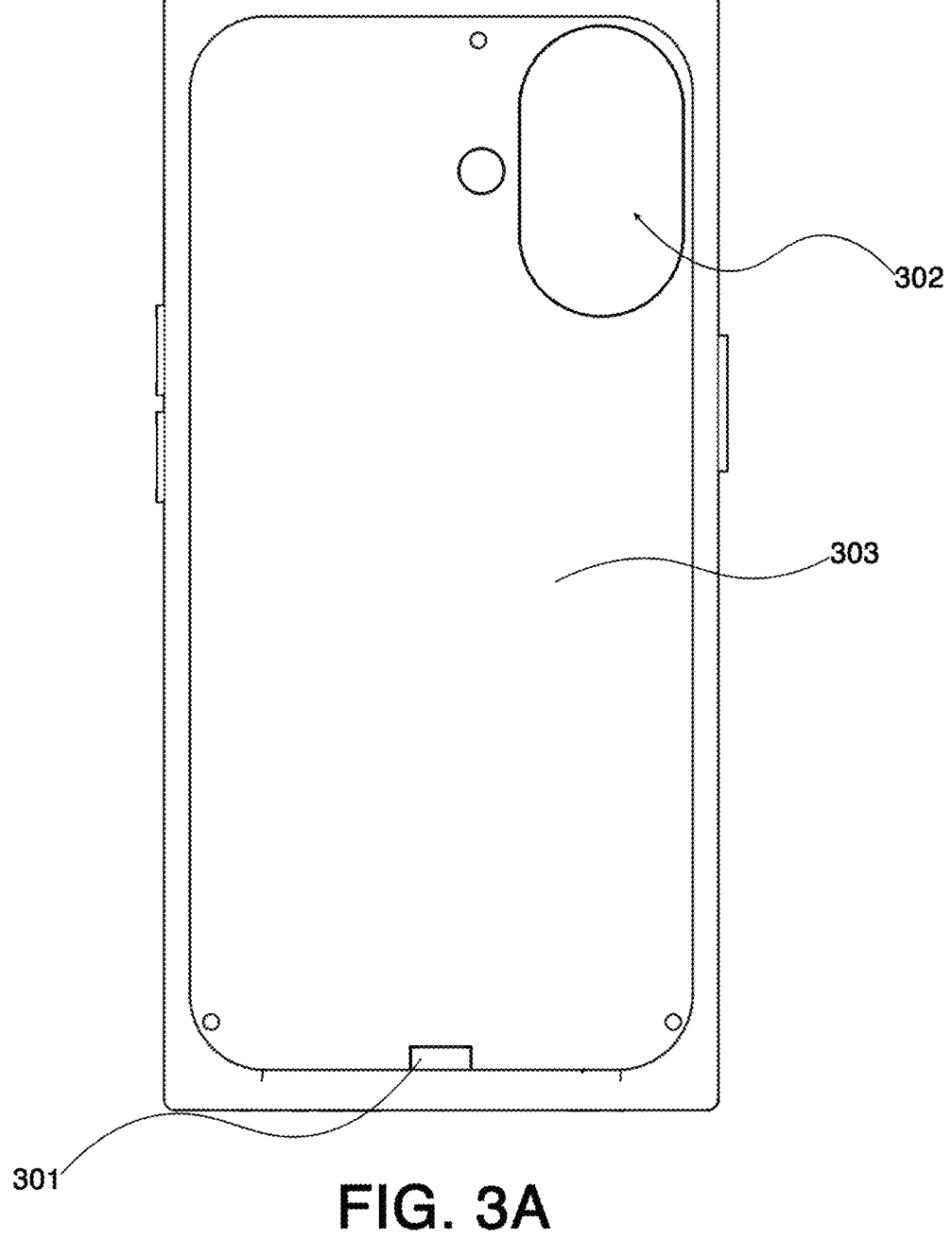
FIG. 3A is a front-facing view of the smartphone case illustrating front-side openings and internal shielding structure.
Figure 3B:
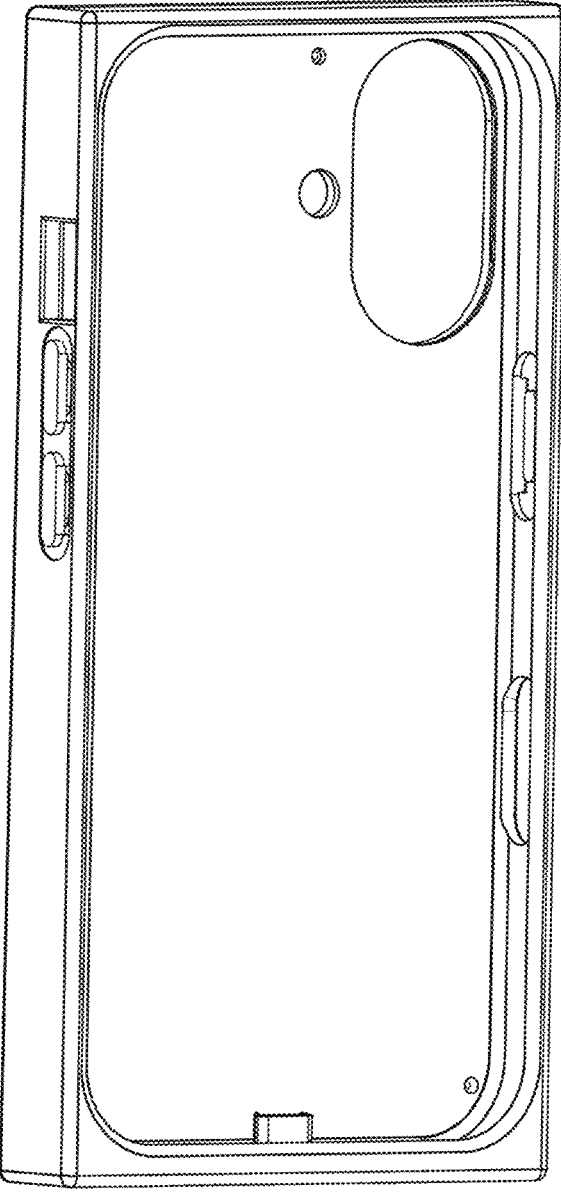
FIG. 3B is a perspective front-facing view of the smartphone case demonstrating external features and component positioning.
Figure 3C:
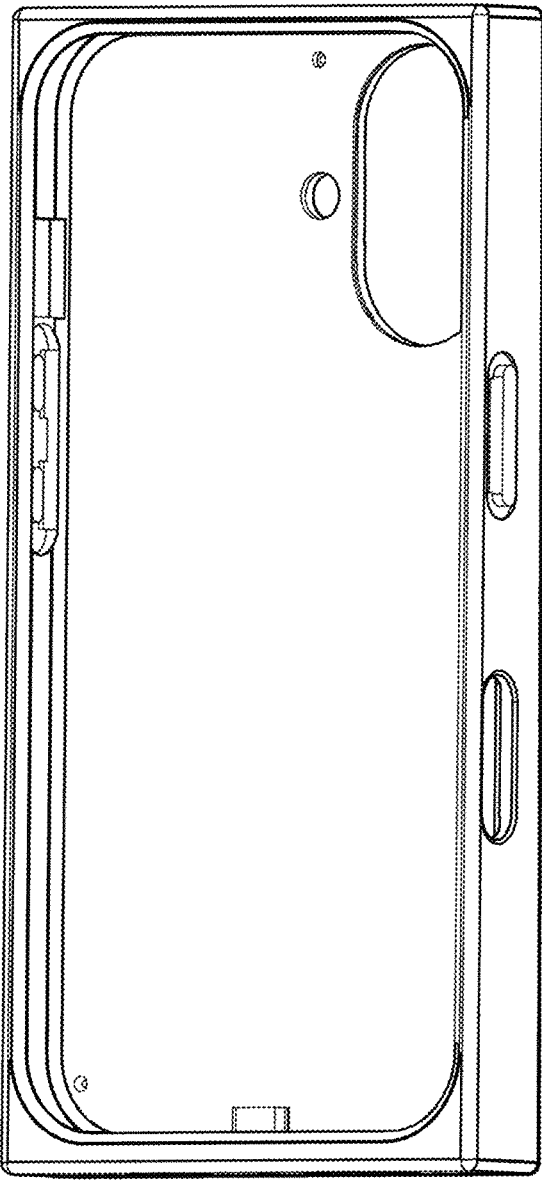
FIG. 3C is an alternate front-facing perspective view showing ergonomic layout and button placements.

The present invention comprises a smartphone case (102) integrated with a rear-facing electronic viewfinder display (101). The core structural components include a custom-designed printed circuit board (PCB), a low-latency IPS display module, and precisely engineered mechanical housing adapted to securely fit around a smartphone device. This PCB interfaces directly with the smartphone via a USB-C connector (105) that supports DisplayPort Alternate Mode (Alt Mode) to facilitate real-time, high-definition video display from the smartphone's rear camera system.

The smartphone case body (102) is preferably constructed from injection-molded polycarbonate or similar durable, lightweight materials. The housing securely accommodates the smartphone, providing a rear camera opening (103) aligned precisely with the smartphone's camera module, speakers, microphones, and charging ports. Additional internal ribs or spacers (303) are strategically located within the case to secure and protect internal components and ensure reliable structural integrity under typical usage conditions.

PCB Stack-Up and Electronics

The PCB incorporates multiple functional layers arranged to optimize electrical performance, thermal management, and mechanical durability.

Electronic components on the PCB include a USB-C receptacle, DisplayPort-to-MIPI display bridge integrated circuit (IC), voltage regulators, decoupling capacitors, and impedance-matched high-speed signal traces. The PCB (404) is fabricated in accordance with industry-standard impedance-controlled routing rules, ensuring optimal signal integrity and minimal latency in video signal transmission. Flexible ribbon cables (401) connect the PCB to the display module and the USB-C port, facilitating efficient internal wiring and assembly.

Display Module and Protective Features

The integrated rear-facing display (101, 402) is a compact IPS (In-Plane Switching) LCD panel, selected for optimal resolution, viewing angle, power consumption, and minimal latency performance. IPS technology providing wide viewing angles essential for clear visibility during handheld filming positions.

The display module (402) is seated within a recessed area of the smartphone case, surrounded by an extruded plastic rim (107) designed to enhance durability and safeguard against impacts. Additionally, a protective layer (111) overlays the display surface to mitigate scratches and enhance overall durability.

Housing and Operational Interface

The case housing includes user-accessible control elements strategically positioned for intuitive operation. A dedicated power button (104) is located on the side of the case, activating the rear-facing display and associated electronic components. Overlay buttons for phone power (106) and volume controls (109) extend the underlying functionality of the smartphone's native buttons, ensuring ease of access through the protective casing. A mute slider opening (108) allows users to maintain functionality of the smartphone's native mute control without compromising the protective integrity of the case.

The case further provides a precisely positioned camera cutout (302) at the top, designed to align exactly with the smartphone's rear camera, ensuring unobstructed image and video capture. Additionally, the case integrates a USB-C connector (105) at its bottom, aligned precisely via the PCB board interface with the smartphone's native USB-C port. An additional USB-C port opening (110, 301) at the bottom of the case facilitates external cable connections for simultaneous charging of both smartphone and internal battery components, prioritizing smartphone charging before charging the integrated battery that powers the viewfinder display.

Internal Components and Assembly

Assembly involves positioning the PCB, battery module (403), and display module (402) within specifically designed compartments formed inside the molded housing. Components are secured using methods such as mechanical fasteners, clips, adhesive tapes, or ultrasonic welding as manufacturing considerations dictate. The battery module (403) is seated securely within a lower cavity, beneath a protective plate and shield (303) lined with a soft backing to ensure protection and structural integrity.

Standardized Electronics Sub-Assembly

Figure 4A:
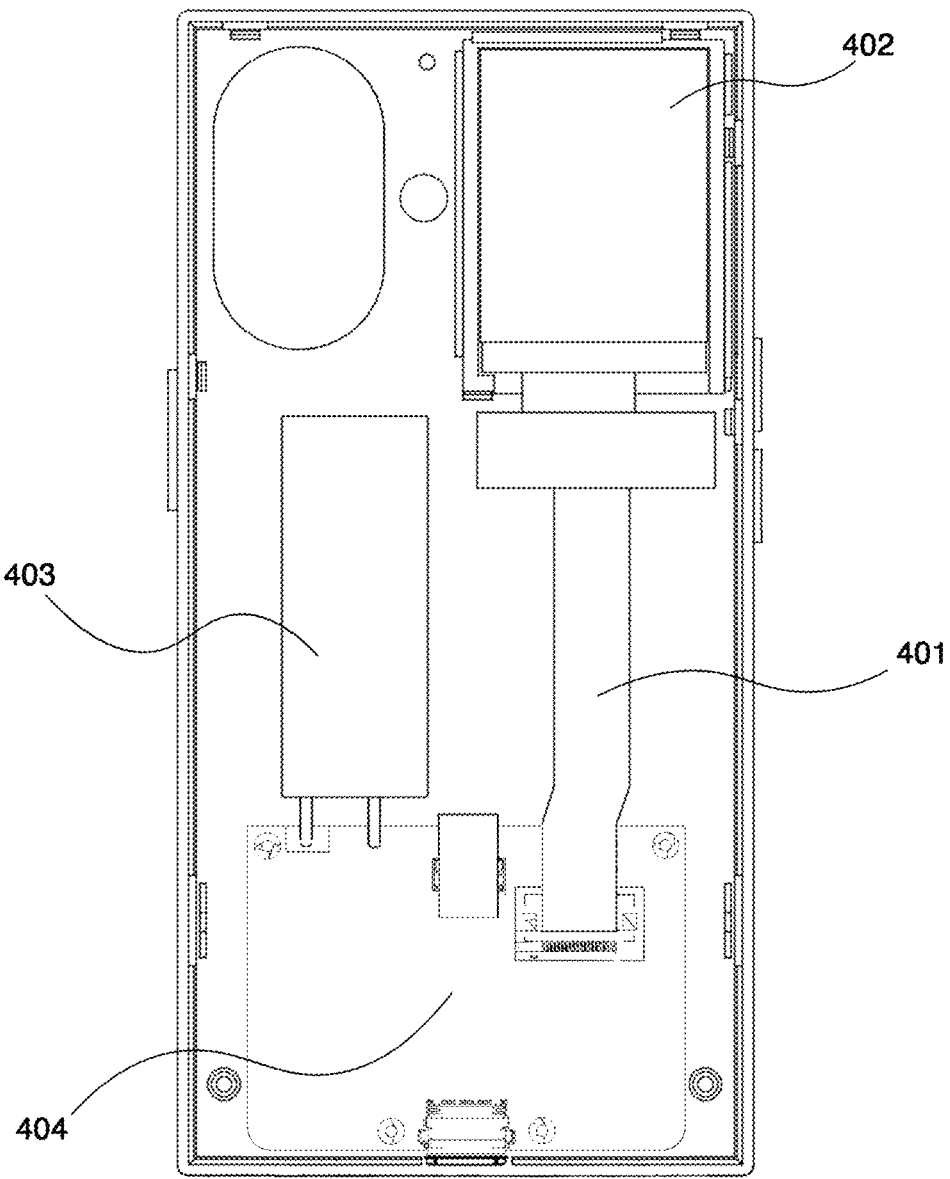
FIG. 4A is a top-down interior view of the lower shell of the smartphone case with electronic components installed, including display, battery, and PCB.
Figure 4B:
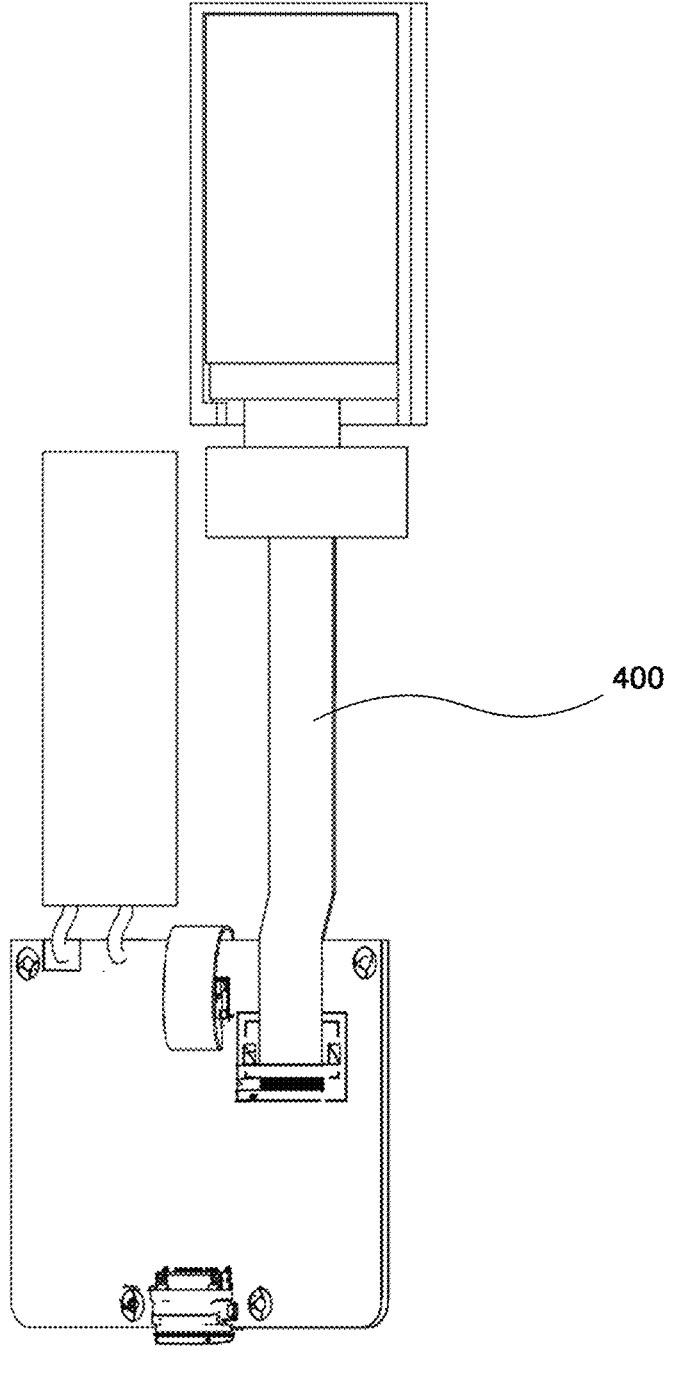
FIG. 4B is an exploded view of the internal electronics assembly illustrating display, battery, ribbon cables, and circuit board components, emphasizing modularity.
Figure 4C:
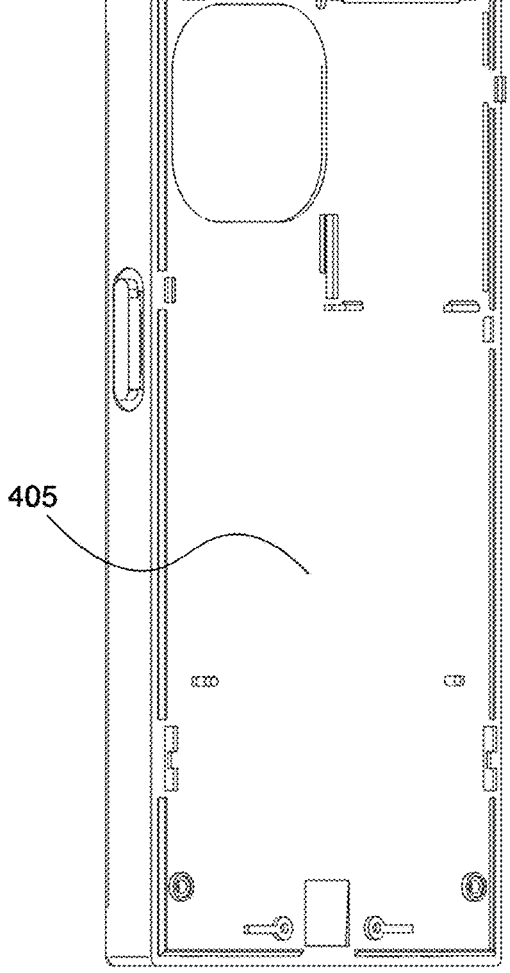
FIG. 4C is an interior view of two alternate phone-specific housings, illustrating standardized receptacle features for receiving the removable electronics module.
Figure 4C:
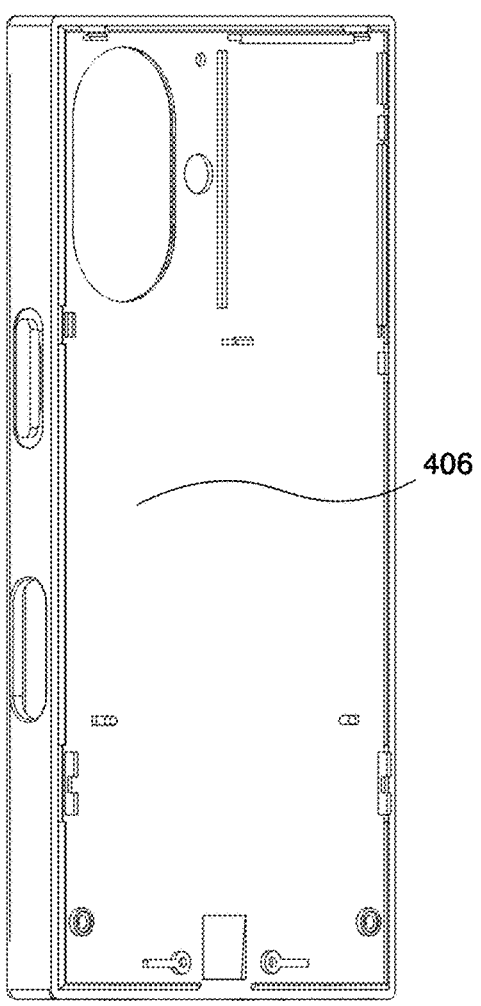
Figure 5A:
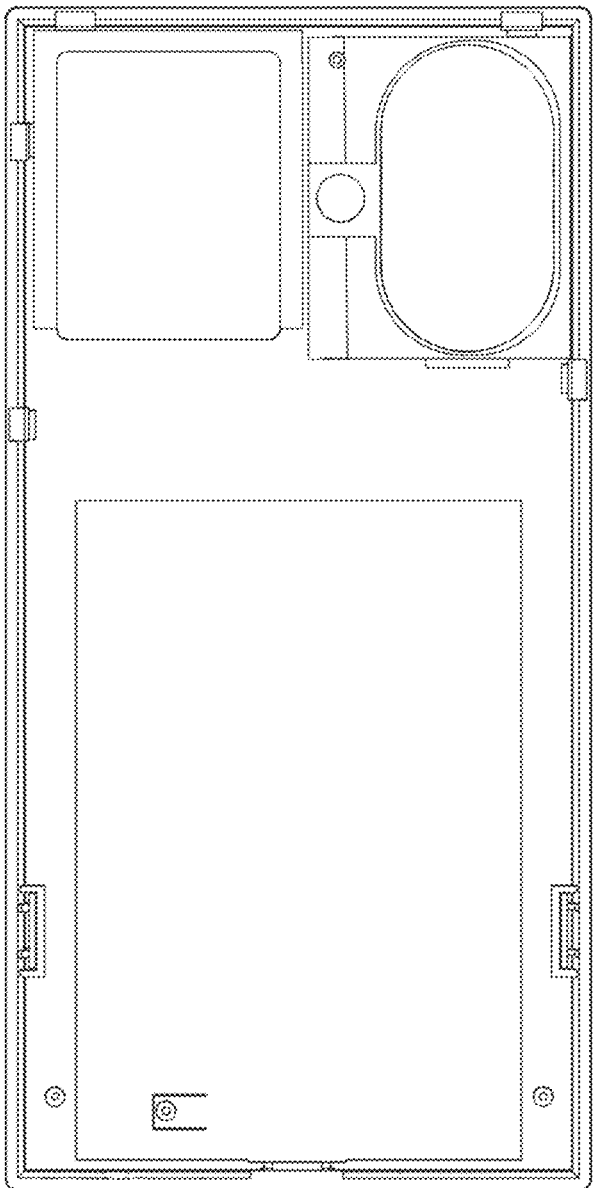
FIG. 5A is an inside view of the upper shell (top cover) of the smartphone case, showing non-electronic structural elements and their alignment features.

FIG. 4B illustrates a standardized electronics sub-assembly (400) integrated within each smartphone-specific protective housing. This electronics sub-assembly (400) includes: a rear-facing display module (402); a printed circuit board (PCB) assembly (404) carrying critical electronic components, including a DisplayPort-to-MIPI bridge integrated circuit (IC), power-management circuits, and USB-C receptacle capable of DisplayPort Alternate Mode (Alt Mode); a battery or power-storage module (403); internal ribbon-cable interconnections (401). The electronics sub-assembly (400) is dimensionally and electrically standardized, allowing it to be integrated consistently across multiple smartphone-specific housings (405, 406). Each housing is distinct in geometry, tailored specifically to individual smartphone models, differing only in external shape, camera module openings, speaker apertures, and control access ports. However, each housing shares identical internal mounting interfaces to accommodate the standardized electronics sub-assembly (400), thus streamlining manufacturing processes, tooling requirements, and inventory management.

Operation

Operationally, upon connecting the case to a smartphone via USB-C, the system automatically detects DisplayPort Alternate Mode signals and activates the rear-facing viewfinder display (101). Users see a real-time preview streamed directly from the smartphone's high-quality rear camera, enabling precise content framing without additional equipment. The system utilizes low-latency technology, providing minimal delay between actual events and their visual representation, essential for video recording applications such as vlogging and live-streaming.

Figure 6:
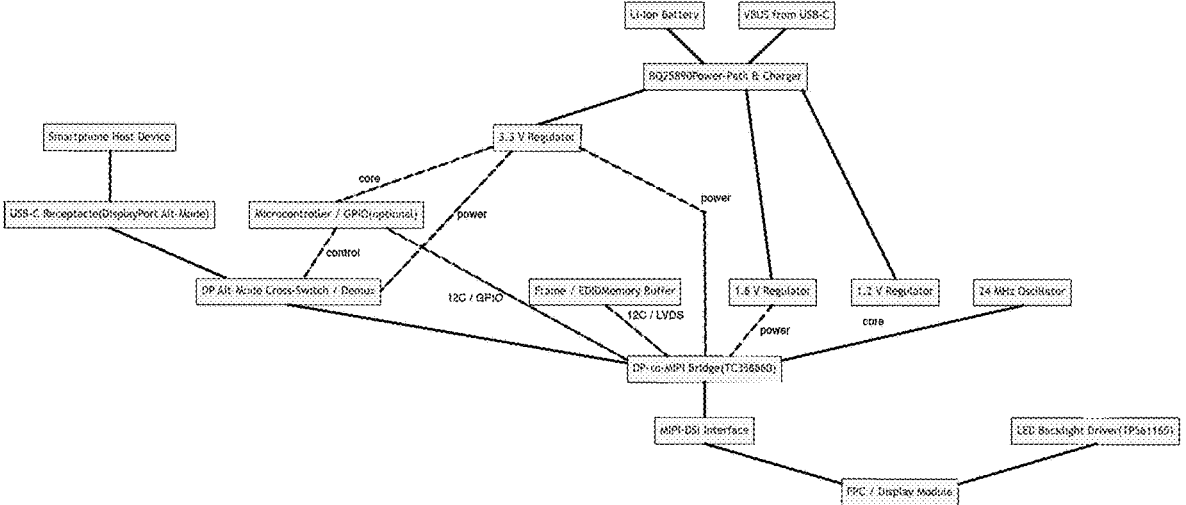
FIG. 6 is a block diagram of the electronic architecture configured to receive a DisplayPort Alternate Mode signal from a smartphone host and render video to a display module, including power management and optional logic blocks.

Electronic Architecture (FIG. 6)

FIG. 6 illustrates the detailed electronic architecture of the invention configured to receive a DisplayPort Alternate Mode signal from a smartphone host device (10) via a USB-C receptacle (20). The received high-speed video signals are routed through a signal switch (30) into a protocol bridge IC (40), converting the DisplayPort stream into a compact display-compatible format (MIPI-DSI) transmitted to the integrated display module (60). The architecture supports dual-source power, with a rechargeable battery (70) and external VBUS input (72) supplying energy managed by the power management subsystem (80) and voltage regulators (90a, 90b, 90c), ensuring continuous operation and minimal power consumption. Additional components include an LED backlight driver (100), oscillator (110), optional control logic (120), and optional storage elements (130) for future enhancements and firmware updates.

What is claimed is:

1. A protective case for a smartphone comprising: a housing adapted to encase the smartphone, the smartphone having at least one rear-facing camera and a Universal Serial Bus (USB) Type-C port that configured for DisplayPort Alternate Mode; a secondary display fixed within a recessed pocket on an exterior rear face of the housing adjacent to a camera opening of the housing; and an electronics sub-assembly disposed within the housing and operatively coupled between the USB Type-C port and the secondary display to convey live video from the rear-facing camera to the secondary display as a real-time viewfinder; the electronics sub-assembly including a protocol bridge that converts DisplayPort Alternate Mode video from the smartphone to Mobile Industry Processor Interface-Display Serial Interface (MIPI-DSI) signaling for the secondary display; wherein the electronics sub-assembly is dimensionally and electrically standardized for use across a plurality of smartphone-specific housings, and each of the smartphone-specific housings shares identical internal mounting interfaces that receive the electronics sub-assembly while differing only in external geometry to accommodate respective smartphone models; and wherein the housing lacks any second body or rotatable cover that carries the secondary display and is rotatably coupled to the housing.

2. The protective case of claim 1, wherein the recessed pocket is bounded by an exterior protective rim surrounding the secondary display such that a viewing surface of the secondary display is flush with or below an upper edge of the rim.

3. The protective case of claim 1, a wherein the protocol bridge forms part of a signal-processing circuit configured to convert DisplayPort Alternate Mode signals into MIPI-DSI signals and to sufficiently low end-to-end latency to serve as a real-time viewfinder image for the smartphone's rear-facing camera.

4. The protective case of claim 1, wherein the secondary display is configured to automatically activate in response to, detection of DisplayPort Alternate Mode signals, and to enter a low-power standby state when DisplayPort Alternate Mode is not active.

5. The protective case of claim 1, wherein the housing further includes an internal rechargeable battery and a power-management subsystem selectively supply power to the secondary display from smartphone-provided USB Type-C Voltage Bus (VBUS) when present, and from battery when smartphone-provided VBUS is absent.

6. The protective case of claim 1, wherein the housing includes standardized receptacle features for receiving and securely retaining the electronics sub-assembly as a removable electronics module.

* * * * *